United States Patent
Sogah et al.

(10) Patent No.: US 7,649,069 B2
(45) Date of Patent: Jan. 19, 2010

(54) FREE RADICAL LIVING POLYMERIZATION INITIATOR ATTACHED NANOCLUSTERS AND NANOCOMPOSITES THEREFROM

(75) Inventors: Dotsevi Y. Sogah, Ithaca, NY (US); Sarav B. Jhaveri, Amherst, MA (US)

(73) Assignee: Cornell Research Foundation, Inc., Ithaca, NY (US)

( * ) Notice: Subject to any disclaimer, the term of this patent is extended or adjusted under 35 U.S.C. 154(b) by 360 days.

(21) Appl. No.: 11/436,981

(22) Filed: May 19, 2006

(65) Prior Publication Data

US 2008/0281070 A1 Nov. 13, 2008

Related U.S. Application Data

(60) Provisional application No. 60/683,292, filed on May 23, 2005.

(51) Int. Cl.
*C08G 73/00* (2006.01)
*C09K 3/00* (2006.01)
*C08G 63/00* (2006.01)

(52) U.S. Cl. ................ 528/9; 528/271; 506/32
(58) Field of Classification Search ............ 506/32; 528/9, 271
See application file for complete search history.

(56) References Cited

U.S. PATENT DOCUMENTS

| 6,572,693 | B1 * | 6/2003 | Wu et al. | 106/35 |
| 7,090,721 | B2 * | 8/2006 | Craig et al. | 106/35 |
| 2001/0000889 | A1 * | 5/2001 | Yadav et al. | 204/242 |
| 2006/0286379 | A1 * | 12/2006 | Gao | 428/403 |

OTHER PUBLICATIONS

Farmer et al, Chem. Mater., 2001, 13, 3920-3926.*
Wang et al, Nano Letters, 2003, 3 (6), 789-793.*
Holzinger et al, Journal of Materials Chemistry, 2004, 14, 2017-2023.*
Murray, et al., J. Am. Chem.Soc., 1993, 115(19), 8706-8715.*
Jhaveri, S. B., et al., Dissertation—"Nanostructured Polymeric Architectures Prepared Via Nitroxide Mediated Living Free Radical Polymerization", Published Oct. 2005, pp. 1-307.

* cited by examiner

*Primary Examiner*—Jerry Lorengo
*Assistant Examiner*—Yun Qian
(74) *Attorney, Agent, or Firm*—Bacon & Thomas, PLLC

(57) ABSTRACT

Free radical living polymerization attached nanocluster (metal oxide, e.g., gamma-$Fe_2O_3$ or FeO nanocluster or quantum dot (e.g., CdSe) nanocluster, are used for polymerization of polymer or copolymer to provide nanocomposite polymers or copolymer arms around nanoclusters.

10 Claims, No Drawings

FREE RADICAL LIVING POLYMERIZATION INITIATOR ATTACHED NANOCLUSTERS AND NANOCOMPOSITES THEREFROM

CROSS-REFERENCE TO RELATED APPLICATIONS

This application claims the benefit of U.S. Provisional Application No. 60/683,292, filed May 23, 2005, the whole of which is incorporated herein by reference.

The work was supported at least in part by the Cornell Center for Materials Research, and National Science Foundation-funded MSERC (DMR-0079992). The government has certain rights in the invention.

TECHNICAL FIELD

This invention is directed at nanocluster polymer or copolymer nanocomposites.

BACKGROUND OF THE INVENTION

Matsuro, R., et al., Chemistry of Materials 15, 3-5 (2003) have prepared a nitroxide based living radical polymerization initiator having a phosphoric acid moiety and used it to interact with magnetic nanoparticles; polymerization in the presence of styrene yielded nanoparticles of polystyrene grafted magnetite; in this case, the living radical polymerization initiator is not attached to the nanoparticles. Skaff, H., et al., Journal of the American Chemical Society 124, 5729-5733 (2002) has employed functional phosphine oxide as ligand for attachment to CdSe nanoparticles and used the combination to support the polymerization of cyclic olefins radially outward from the surfaces by ruthenium-catalyzed ring-opening metathesis polymerization (ROMP); in this case there is no living free radical polymerization but rather metathesis polymerization. The same group has recently reported (Sill, K., et al., Chemistry of Materials 16, 1240-1243 (2004)) the use of nitroxide-mediated controlled free radical polymerization by attachment of phosphine oxide functional alkoxyamine initiator directly from the surface of CdSe nanoparticles to prepare dispersed polymer-nanoparticle composite materials; this differs from the invention in that the initiator is different.

Heretofore there has been no other report of formation of free radical living polymerization initiators attached to nanoclusters and use thereof to form oxide or quantum dot star polymers or copolymers.

SUMMARY OF THE INVENTION

In one embodiment herein, denoted the first embodiment, the invention is directed to a free radical living polymerization initiator bound (attached) nanocluster provided that the free radical living polymerization indicator is TIPNO-P (described below) when the nanocluster is CdSe nanocluster, or preferably for any quantum dot or other nanocluster. TIPNO-P is advantageous compared to the initiator used in Sill, K., et al., Chemistry of Materials 16, 1240-1243 (2004) in that it is useful for nanoclusters besides CdSe nanoclusters, works at lower temperatures (less than 125° C.), can be used to polymerize a wider range of monomers including acrylamides and acrylates and is more efficient. It prevents thermal/homopolymerization of styrene and other monomers thus providing a better control on the polymerization.

In another embodiment herein, denoted the second embodiment, the invention is directed to the case of the first embodiment wherein the nanocluster is a metal oxide nanocluster.

In another embodiment herein, denoted the third embodiment, the invention is directed to the case of the first embodiment wherein the nanocluster is a quantum dot nanocluster.

Still another embodiment herein, denoted the fourth embodiment of the invention, is directed to a nanocomposite which is composed of polymer or copolymer arms around a metal oxide nanocluster.

Still another embodiment herein, denoted the fifth embodiment of the invention, is directed to a nanocomposite which is composed of polymer or copolymer arms around quantum dot nanoclusters.

Still another embodiment herein, denoted the sixth embodiment, is directed to nanocomposite of the fifth embodiment where the ends of the polymer or copolymer arms (chain ends) have been made biotin functional.

The term "nanocluster" is used herein to mean a cluster of atoms or molecules whose characteristic dimensions are a few nm.

The term "nanocomposite" is used herein to mean composition of nanoparticles in a polymer matrix. The term "nanoparticle" means a discrete amount having at least one dimension less than 10 nm. In the case of the invention herein the matrix is constituted of the polymer arms.

DETAILED DESCRIPTION

We turn to the first embodiment herein. The nanoclusters can be metal oxide nanoclusters or quantum dot nanoclusters or silica (silicondioxide) nanoclusters.

We turn now to the second embodiment herein.

The metal oxide nanoclusters can be, for example, gamma-$Fe_2O_3$ or Fe (II, III) oxide nanoclusters. The free radical living polymerization initiator is preferably 2, N-t-butyl-O-{1-[4-decyclohexylphosphinoylmethyl)-phenyl]-ethyl}-N-(2-methyl-1-phenyl-1-propyl)-hydroxyl amine, which is denoted TIPNO-P.

In the case of gamma-$Fe_2O_3$, amine capped nanoclusters can be synthesized according to the procedure reported by Rockenbergen, J., et al., Journal of the American Chemical Society 121, 11595-11596 (1999). The initiator described above can be attached to the amine capped gamma-$Fe_2O_3$ nanocluster by a ligand exchange/substitution process which includes heating of the nanoclusters and the alkoxyamine initiator in an organic solvent such as toluene, and subsequently purifying the initiator attached nanoclusters from the reaction mixture.

In the case of Fe (II, III) oxide nanoclusters, these are available commercially as iron oxide nanopowder from Sigma-Aldrich (CAS Number 1317-61-9, Aldrich No. 637106), and said initiator can be attached by a ligand binding process similar to the ligand exchange process described above for the amine capped gamma-$Fe_2O_3$ nanoclusters.

We turn now to the third embodiment herein.

The term "quantum dot" is used herein to mean a particle of matter so small that the addition or removal of an electron changes its properties in some way and as used herein means semiconductor nanocluster. The quantum dot nanoclusters include, for example, those of CdS, CdSe, CdTe and ZnSe. They are synthesized in a single pot reaction, from Cd and/or Zn containing precursors. The nanoclusters are formed by initial nucleation and subsequent crystallization. The size of the dots or clusters is controlled by the amount of crystallization time. CdSe was used in experiments herein in the form of trioctylphosphine oxide (TOPO) covered CdSe dots. The TOPO covered CdSe quantum dots can be prepared as follows: CdO and TOPO are dissolved in hexylphosphonic acid (HPA) at 360° C. and a stock solution of chalcogen (Se) is added. Nanoclusters of TOPO covered CdSe quantum dots are formed by the nucleation and crystallization events described above.

The reaction equation for synthesis of phosphine-oxide functionalized alkoxyamine initiator, referred to above as TIPNO-P and hereinafter as LFRP initiator, is set forth below.

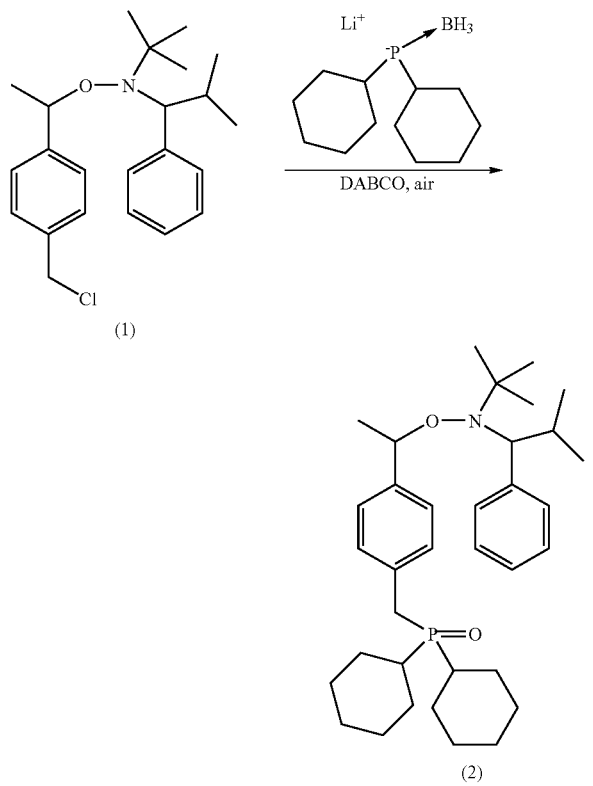

As depicted above, phosphine oxide group is introduced by conversion of chloro functional alkoxyamine (1) into borane-protected phosphorus salt and phosphine and oxidizing into phosphine oxide (2). The phosphine group is attached onto the alkoxyamine by displacement of the chloride group by "activated" borane-protected phosphine anion. The activated borane-protected phosphine anion is prepared by deprotection of borane phosphine complex using n-Bu-Li, in accordance the procedure reported by Mohr, B., et al., Organometallics 15, 4317-4325 (1996). The borane protection of the phosphine gives a crude water soluble initiator which is stable to both air and water. Deprotection by removing the borane group is carried out on the crude initiator by heating in an excess of 1,4-diazabicyclo[2.2.2]octane, denoted DABCO, at 40-60° C. for 3-4 hours. The resulting free phosphine alkoxyamine is maintained in air for a day whereby it is gradually oxidized to the oxide (2). A solution of (2), that is, of LFRP initiator, e.g., 2 g/100 ml in organic solvent such as toluene, can be prepared and used as needed.

The LFRP initiator used in excess is attached onto TOPO covered CdSe nanoclusters via ligand exchange as follows: The LFRP initiator (in excess compared to CdSe), 0.1 g, dissolved in 5 mL toluene, is added to 10 mL solution of 20 mg TOPO covered CdSe in toluene solvent, under $N_2$. The resulting solution is stirred for 24 hours at 60° C. Toluene is then removed under reduced pressure. Methanol (15 mL portions) is added to precipitate initiator bound nanocluster, i.e., LFRP initiator bound TOPO covered CdSe nanocluster and the precipitate is recovered by centrifuging and decanting of liquid. The rinsing process is repeated to remove unbound organics. The solid is dried to obtain LFRP initiator bound TOPO covered CdSe nanocluster.

We turn now to the fourth embodiment herein.

In one case, initiator bound gamma-$Fe_2O_3$ nanoclusters as described above, are dispersed in styrene, and living free radical polymerization of styrene is effected from the surface of the nanocluster, to generate gamma-$Fe_2O_3$ star polystyrene nanocomposites with polymer arms, e.g., of $M_n$, ranging from 5,000 to 500,000 grams per mole, e.g., $M_n$=80K grams per mole and PDI of 1.56. For example, the initiator bound gamma-$Fe_2O_3$ nanocomposite (50 mg) is added to 500 mg of styrene and the combination is heated at 125° C. for 15 hours to generate gamma-$Fe_2O_3$ star polystyrene nanocomposite. The reaction equation is set forth below:

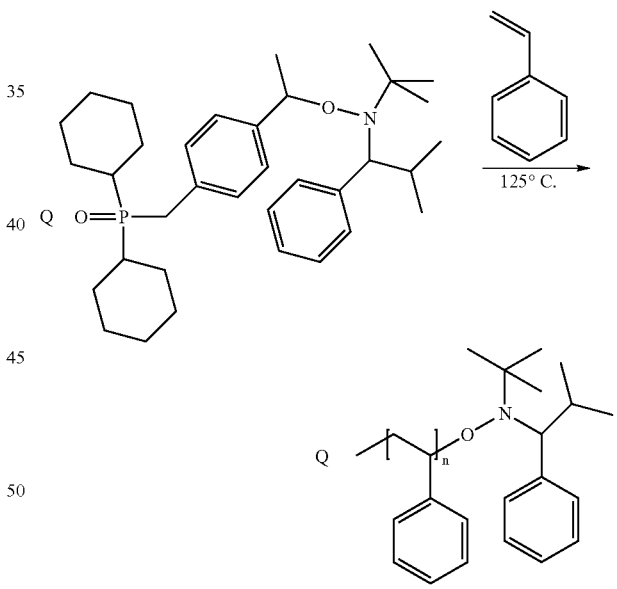

In the reaction equation Q is amine capped gamma-$Fe_2O_3$ nanocluster. Experiments that were carried out produced the results set forth in Table 1 below.

TABLE 1

| Name | FeO—I | Styrene | Yield (g) | % Yield | $M_w{}^a$ | $PDI^a$ | $Fe_2O_3$ | Decomposition Temp ($T_d$ ° C.)$^b$ |
|---|---|---|---|---|---|---|---|---|
| FeO-PS1 | 20 mg | 100 mg | 27 mg | 27.0 | 18.61K | 1.49 | 33.24 | 362.82, 412.09 |
| FeO-PS2 | 20 mg | 200 mg | 77 mg | 38.5 | 33.60K | 1.49 | 30.77 | 374.71, 419.93 |

TABLE 1-continued

| Name | FeO—I | Styrene | Yield (g) | % Yield | $M_w{}^a$ | $PDI^a$ | $Fe_2O_3$ | Decomposition Temp ($T_d$ °C.)[b] |
|---|---|---|---|---|---|---|---|---|
| FeO-PS3 | 20 mg | 300 mg | 101 mg | 33.7 | 43.84K | 1.59 | 18.01 | 384.79, 421.34 |
| FeO-PS4 | 20 mg | 400 mg | 191 mg | 47.8 | 58.78K | 1.49 | 13.35 | 393.42, 421.31 |

In Table 1, FeO—I is initiator bound gamma $Fe_2O_3$ nanocluster. $M_w$ is weight average molecular weight. $M_w$ and PDI were obtained by GPC on removed polymer arms, using polystyrene standards. $T_d$ and $Fe_2O_3$(%) were obtained by TGA. The nanocomposite (gamma-$Fe_2O_3$ star polystyrene nanocomposite) was soluble in tetrahydrofuran, toluene and chloroform whereas the amine covered nanoclusters were not. The nanocomposites were attracted to magnets though less strongly than free gamma-$Fe_2O_3$.

In another case, LFRP initiator bound iron oxide (FeO) is added to styrene and living free radical polymerization is carried out to obtain FeO-star polystyrene with polymer arms, e.g., of $M_n$ of 5,000 to 500,000 grams per mole, e.g., $M_n$ of 86.21K grams per mole and PDI=1.46 were obtained.

In still another case, FeO star amphiphilic copolymer synthesis was carried out as shown in the reaction scheme below.

butyl acrylate) block can have $M_n$ ranging, e.g., from 5,000 to 500,000 grams per mole (31.68K grams per mole was obtained with PDI of 1.49) and the diblock can have $M_n$ from 5,000 to 500,000 grams per mole (diblock $M_n$ of 121.40K grams per mole with PDI of 1.65 was obtained). Incorporation of the polyacrylic acid) in the diblock enabled formation of the thin films of polymeric nanoclusters over microdomain regions. The hydrophobic polystyrene segments on the outside provide a hard polymeric shell.

Nanocomposite for the fourth embodiment is useful for applications in fields such as coatings, printing, recording, information and data storage, magnetic resonance imaging (MRI) and drug delivery systems.

We turn now to the fifth embodiment. Initiator bound CdSe nanocluster which is the subject of the third embodiment, in experiments herein is used to effect living free radical poly-

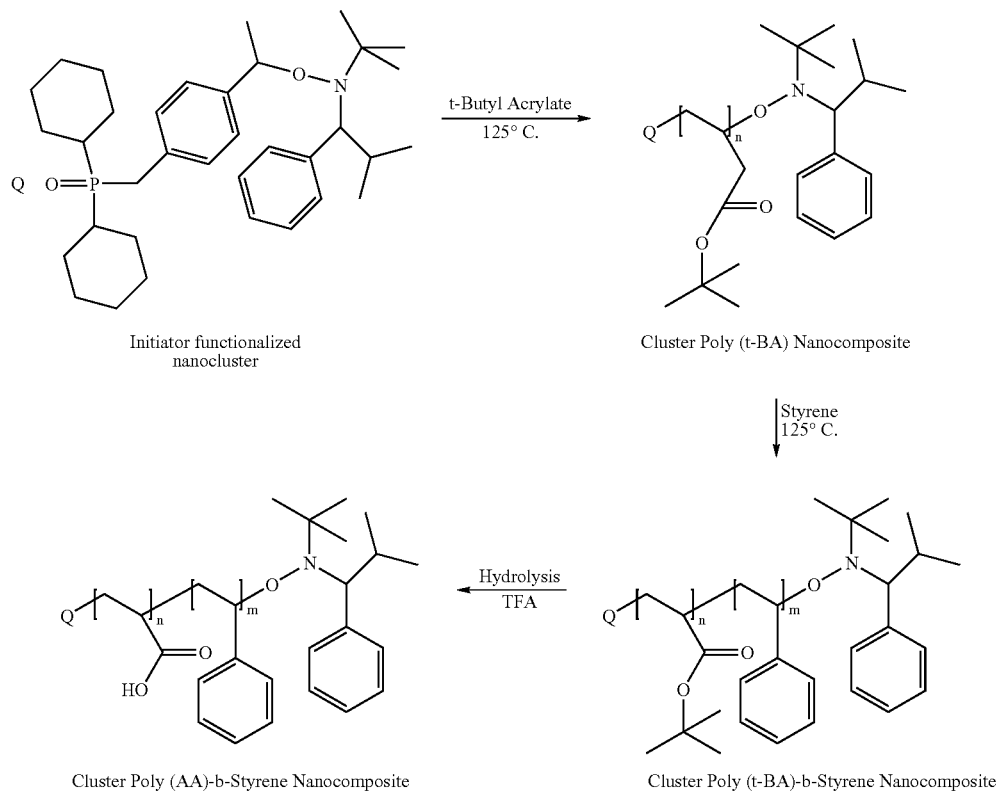

In the above reaction scheme, Q is FeO nanocluster. As indicated in the reaction scheme directly above, diblock polymerization was carried out using initiator bound FeO nanocluster of the second embodiment to produce first a poly(t-butyl acrylate) block and then a polystyrene block, followed by hydrolysis with trifluoroacetic acid to convert the poly(t-butyl acrylate) block to a poly(acrylic acid) block. The poly(t- merization of styrene from the surface of the nanoclusters to generate CdSe star polystyrene nanocomposites.

In these experiments FRLP initiator is bound to TOPO-covered CdSe nanoclusters by dissolving in toluene and reaction at 60° for one day. FRLP initiator bound TOPO-covered CdSe nanocluster is dispersed in styrene and living free radical polymerization of styrene is effected by reaction at 125°

C. for 24 hours to provide nanocomposite composed of polystyrene arms around a CdSe nanocluster.

In the instant experiment, $M_n$, e.g., of 5,000 to 500,000 grams per mole can be obtained ($M_n$=98K grams per mole with PDI=1.90 was obtained). The product is denoted CdSe—PS.

We turn now to the sixth embodiment. Biotin functionality is imparted to chain ends of the nanocomposites of the fifth embodiment, e.g., by nitroxide exchange as follows: The CdSe—PS is biotinylated by reaction of the CdSe—PS with a alkoxyamine bearing a biotin group on the nitroxide end (functional initiator), in dimethylformamide at 125° C. for 4 hours. A few milligrams is the functional equivalent to 100 mg of CdSe—PS since only the chain ends of the polymers need to be functionalized. Biotinylated polymeric particles, i.e., biotinylated CdSe—PS, can be recovered by precipitation in methanol. The biotin groups can bind to streptavidin or avidin which will bind to biotinylated biosensor, e.g., biotinylated antibody, biotinylated antigen, biotinylated DNA or biotinylated other molecule that specifically binds to a target, e.g., antigen, antibody or molecule that hybridizes with DNA or other molecule, to detect the target.

Elements of the invention and working examples are found in "Nanostructured polymer architectures prepared via nitroxide mediated living free radical polymerization: Jhaveri, Sarav B., Dissertation, Cornell University, Ithaca, N.Y., U.S.A.

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. Composition which is free radical living polymerization initiator bound nanocluster where the free radical living polymerization initiator is 2, N-t-butyl-O-{1-[4-decyclohexylphosphinoylmethyl)-phenyl]-ethyl}-N-(2-methyl-1-phenyl-1-propyl)-hydroxyl amine (TIPNO-P).

2. The composition of claim 1 where the nanocluster is a metal oxide nanocluster.

3. The composition of claim 2 where the metal oxide is gamma-$Fe_2O_3$.

4. The composition of claim 2 where the metal oxide is FeO.

5. The composition of claim 1 where the nanocluster is a quantum dot nanocluster.

6. The composition of claim 5 where the quantum dot is selected from the group consisting of CdS, CdTe, and ZnSe.

7. The composition of claim 6 where the quantum dots is trioctylphosphine oxide (TOPO) covered.

8. The composition of claim 1 where the TIPNO-P is directly attached to the nanocluster.

9. Composition which is free radical living polymerization initiator bound nanocluster where the free radical living polymerization initiator is 2, N-t-butyl-O-{1-[4-decyclohexylphosphinoylmethyl)-phenyl]-ethyl}-N-(2-methyl-1-phenyl-1-propyl)-hydroxyl amine (TIPNO-P) and the nanocluster is a CdSe quantum dot.

10. The composition of claim 9 where the quantum dot is trioctylphosphine oxide (TOPO) covered.

* * * * *

UNITED STATES PATENT AND TRADEMARK OFFICE
CERTIFICATE OF CORRECTION

PATENT NO. : 7,649,069 B2  Page 1 of 1
APPLICATION NO. : 11/436981
DATED : January 19, 2010
INVENTOR(S) : Sogah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Twenty-eighth Day of December, 2010

David J. Kappos
*Director of the United States Patent and Trademark Office*